United States Patent
Chae

(10) Patent No.: US 7,165,645 B2
(45) Date of Patent: Jan. 23, 2007

(54) FIXING DEVICE FOR AN AUTOMOBILE MUFFLER

(75) Inventor: Sung-Soo Chae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 165 days.

(21) Appl. No.: 10/699,115

(22) Filed: Oct. 31, 2003

(65) Prior Publication Data

US 2004/0089493 A1 May 13, 2004

(30) Foreign Application Priority Data

Oct. 31, 2002 (KR) .................. 10-2002-0066975

(51) Int. Cl.
*B60K 13/04* (2006.01)
(52) U.S. Cl. .................. 180/309; 180/89.2
(58) Field of Classification Search ............. 180/309, 180/296, 89.2; 248/60, 62, 65, 74.1, 74.4
See application file for complete search history.

(56) References Cited

U.S. PATENT DOCUMENTS

| | | | |
|---|---|---|---|
| 3,261,579 A * | 7/1966 | Engman et al. ............ | 248/60 |
| 3,779,327 A * | 12/1973 | Perreault .................. | 180/190 |
| 4,349,078 A * | 9/1982 | Shimada et al. ........... | 180/69.1 |
| 4,547,344 A * | 10/1985 | Divilio et al. ............ | 422/310 |
| 4,615,500 A * | 10/1986 | Layson ..................... | 248/65 |
| 4,634,088 A * | 1/1987 | Schad ...................... | 248/60 |
| 4,643,458 A * | 2/1987 | Ammar ..................... | 285/62 |
| 5,197,698 A * | 3/1993 | Bartholomew ............ | 248/60 |
| 5,570,861 A * | 11/1996 | Olsen et al. .............. | 248/74.1 |
| 6,572,070 B1* | 6/2003 | Arciero et al. ............ | 248/610 |
| 6,851,506 B1* | 2/2005 | Bovio ...................... | 180/296 |

FOREIGN PATENT DOCUMENTS

| | | |
|---|---|---|
| JP | 8058400 | 3/1996 |
| JP | 9242536 | 9/1997 |
| JP | 2000255456 | 9/2000 |
| JP | 2002036889 | 2/2002 |
| JP | 2002160536 | 6/2002 |

* cited by examiner

*Primary Examiner*—Paul N. Dickson
*Assistant Examiner*—Bridget Avery
(74) *Attorney, Agent, or Firm*—Morgan Lewis & Bockius LLP

(57) ABSTRACT

A fixing device for an automobile muffler is constructed to effectively support and minimize the vertical and transverse movement of a muffler in relation to a car body via a resilient hanger that is diagonally angled. The rear part of the resilient hanger is attached with a cover bracket and a body side bracket, wherein the cover bracket is formed with a vertical flange surface and the body side bracket is formed with a vertical protrusion surface, thereby effectively support any longitudinal movement of the muffler against the vehicle, and increasing the rigidity of connecting parts between the muffler and an exhaust pipe via the cover bracket.

1 Claim, 3 Drawing Sheets

FIXING DEVICE FOR AN AUTOMOBILE MUFFLER

CROSS-REFERENCE TO RELATED APPLICATIONS

This application claims priority of Korean Application No. P2002-66975, filed on Oct. 31, 2002, the disclosure of which is incorporated fully herein by reference.

FIELD OF THE INVENTION

The present invention relates to a technique of fixing an automobile muffler to a vehicle. More particularly, the present invention relates to a technique adapted to effectively limit relative movement of an automobile muffler relative to a body of a vehicle.

BACKGROUND OF THE INVENTION

A muffler is designed to muffle noise generated from an engine. Typically, the muffler is centrally mounted along the exhaust pipe installed in the longitudinal direction of a vehicle for primarily discharging exhaust gas from an engine toward the rear of the vehicle. The exhaust pipe is installed with a catalytic converter for purifying the exhaust gas. In general, the exhaust pipe is secured at an appropriate location underneath the vehicle while the muffler, catalytic converter and the like are mounted onto the exhaust pipe.

There are three ways the exhaust pipe, muffler and catalytic converter may be fixed to the bottom of a vehicle. First, the exhaust pipe may be directly fixed to the bottom of a vehicle, with the muffler and catalytic converter being mounted onto the exhaust pipe. Second, the muffler and catalytic converter may be directly secured to the bottom of a vehicle, where the load is concentrated, with the exhaust pipe being mounted onto the muffler and catalytic converter. And third, the exhaust pipe, muffler and catalytic converter may all be directly fixed to the bottom of a vehicle.

However, there is a drawback in the fixing of an automobile muffler thus described in that, typically, there contains a gap at a preset interval between the muffler mounted on the exhaust pipe with a catalytic converter or the like and the bottom surface of the vehicle. This gap generates vibration and noise in relation to the motion of the vehicle according to its installation condition. Further, the life of the connecting parts to the exhaust pipe and the muffler is greatly affected by how and where the muffler is mounted underneath a vehicle.

SUMMARY OF THE INVENTION

Embodiments of the present invention provide fixing devices for an automobile muffler configured to effectively support and minimize movement of an automobile muffler secured underneath a vehicle while the vehicle is in motion or undergoes rough terrain. In a preferred embodiment, the present invention further provides a fixing device for an automobile muffler that effectively minimizes longitudinal vibration of the muffler and improves the strength of the connection parts that connect the muffler and exhaust pipe.

In accordance with one embodiment of the present invention, a fixing device for an automobile muffler comprises plurality of muffler side connecting means respectively fixed at both sides of a muffler and aligned approximately parallel to the longitudinal axis thereof. Plurality of car body side connecting means are approximately paralleled to the plurality of muffler side connecting means and fixed at a car body where the interval between the plurality of car body side connecting means is longer than that of the plurality of muffler side connecting means. A resilient hanger has insertion holes to be inserted into the muffler side connecting means and the car body side connecting means respectively.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

Hereinafter, a preferred embodiment of the present invention will be described in detail with reference to the accompanying drawings.

Figure 1:
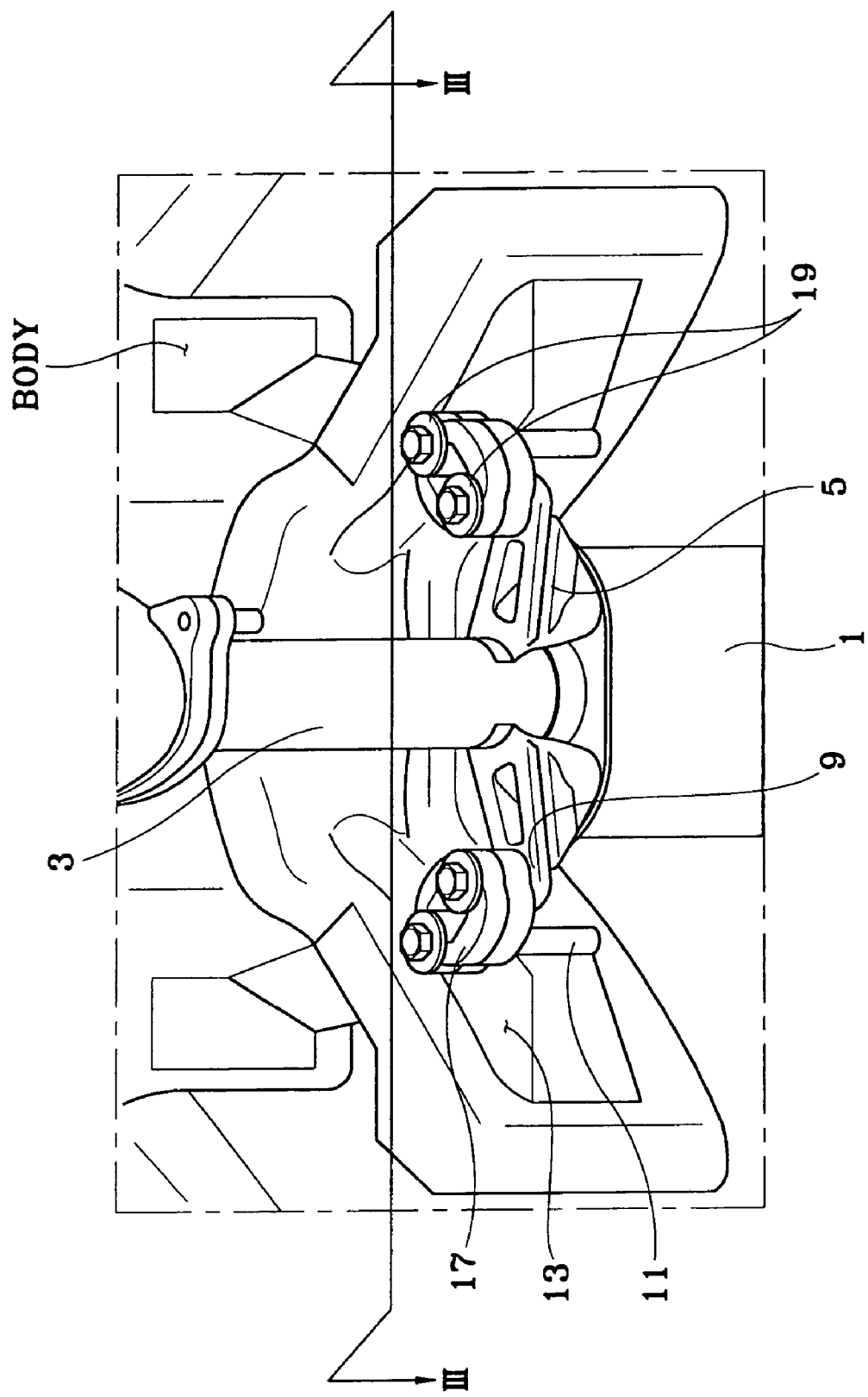
FIG. 1 is a perspective view showing a fixing device for an automobile muffler observed from the lower side of a vehicle according to the present invention.
Figure 2:
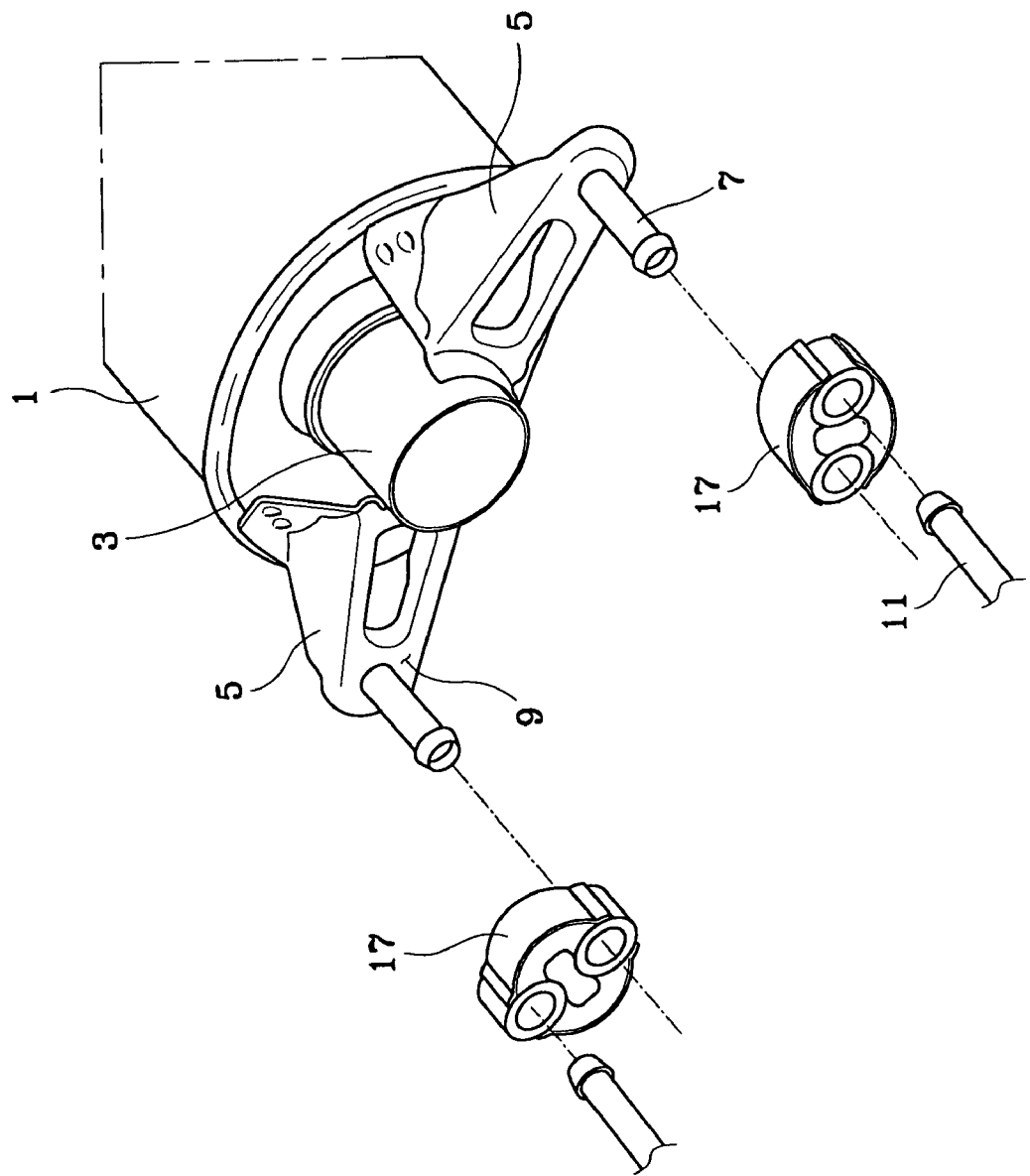
FIG. 2 is an exploded perspective view of the fixing device for an automobile illustrated in FIG. 1.
Figure 3:
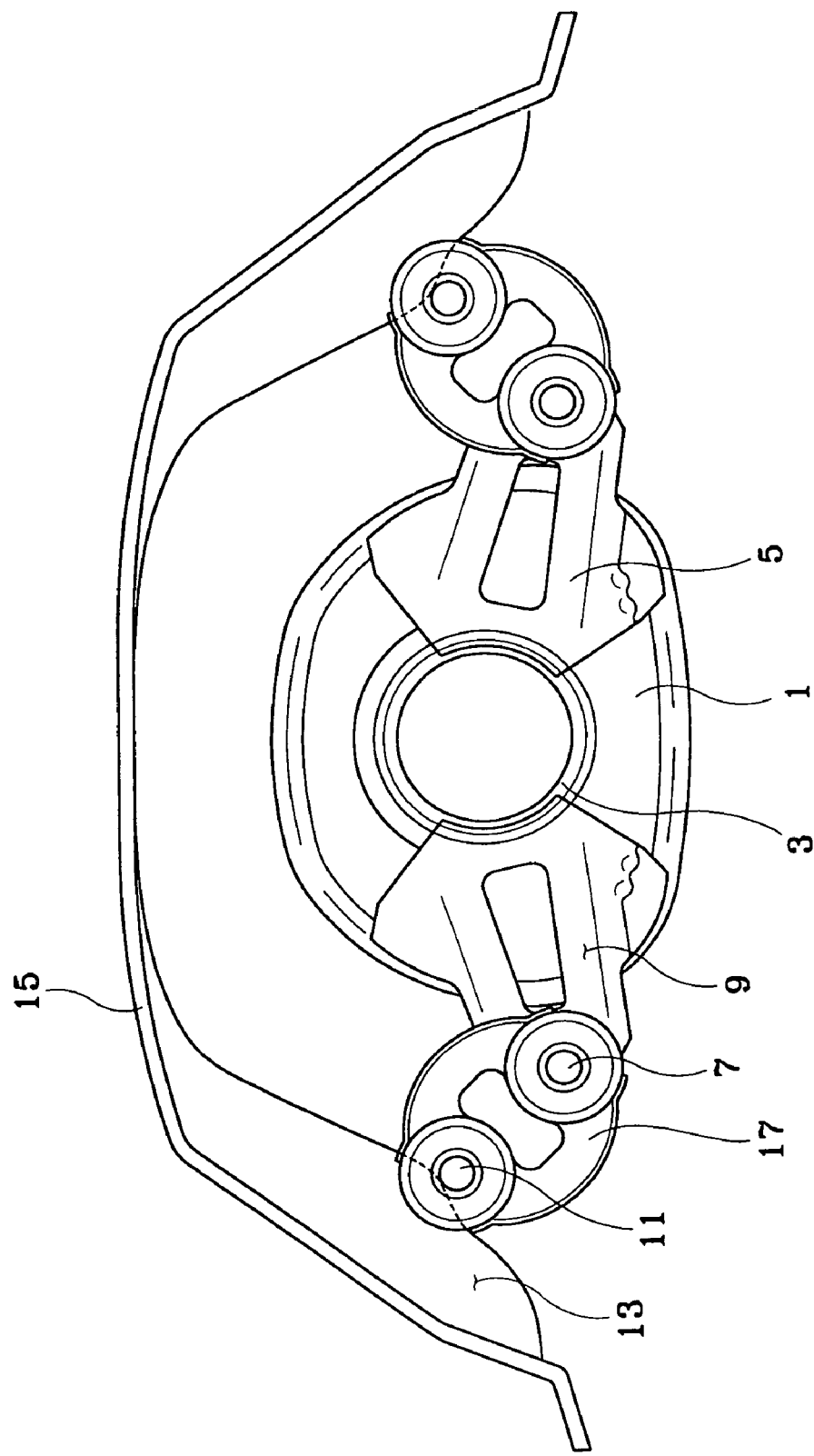
FIG. 3 is an observational view taken along line III—III of FIG. 1.

As shown in FIGS. 1–3, a muffler 1 is connected to an exhaust pipe 3 wherein a cover bracket 5 around a connecting part of the muffler 1 and the exhaust pipe 3 is welded at both sides thereof. The cover bracket 5 is formed with two muffler side connecting pins 7 that are aligned approximately parallel to the longitudinal axis of the muffler. Muffler side connecting pins 7 generally make up a muffler side connecting means.

The cover bracket 5 is also formed with a vertical flange surface 9, preferably facing the front of the vehicle. Muffler side connecting pins 7 protrude from the vertical flange surface 9, also preferably toward the front of the vehicle.

A body of a vehicle (hereinafter referred to as a car body) is mounted with two body side connecting pins 11 approximately parallel to the two muffler side connecting pins 7. The two car body side connecting pins 11 are preferably distantly fixed to the car body at a longer interval than that of the two muffler side connecting pins 7. Car body side connecting pins 11 generally make up a car body side connecting means.

As shown in FIG. 3, two car body side connecting pins 11 may be protrusively welded on a vertical protrusion surface 13. A car body side bracket 15 is mounted underneath the vehicle to provide the vertical protrusion surface 13 on the same flat side as the vertical flange surface 9.

A resilient hanger 17 is inserted between a muffler side connecting pin 7 and a car body side connecting pin 11, and is formed at a predetermined interval with insertion holes into which the muffler side connecting pin 7 and the car body side connecting pin 11 are respectively inserted.

The axis connecting the insertion holes of the resilient hanger 17 received on one muffler side connecting pin 7 and on the corresponding car body side connecting pin 11 is preferably inclined about 30 to 60 degrees above horizontal. A 45 degree angle is most preferred because the distance between the two car body side connecting pins 11 is preferably longer than the distance between the two muffler side connecting pins 7.

According to an embodiment of the present invention thus described, resilient hanger 17 diagonally connects the muffler side connecting pin 7 and the car body side connecting pin 11 to support the muffler 1 and attenuate any movement between the muffler 1 and the car body. The resilient hanger 17 stretches when movement occurs between the muffler 1 and the car body.

A supporting or an attenuating force accompanied by the stretch of the resilient hanger 17 in a diagonal direction thereof acts as a component force of the vertical or the horizontal direction so as to either support or attenuate the vibration of the muffler 1 by utilizing the vertical component force of the resilient hanger 17 when the muffler 1 vertically moves away or toward the car body. On the other hand, once the muffler 1 starts to vibrate, the component force in the horizontal direction of the resilient hanger 17 comes to support the muffler 1 and attenuate the vibration of the muffler 1.

In short, the conventional supporting or attenuating force of the resilient hanger 17 is mainly provided in a vertical direction only, but the embodiment of the present invention enables to effectively support and attenuate the vibration of the muffler 1 in all vertical and transverse directions thereof.

The rear portion of the resilient hanger 17 mates against the vertical flange surface 9 and the vertical protrusion surface 13, such that the vertical movement of a vehicle with respect to the muffler 1, which is generated while the speed of the vehicle is adjusted, can be minimized via the vertical flange surface 9 and the vertical protrusion surface 13. The frontal portion of resilient hanger 17 is abutted with a pair of washers 19 for restricting the longitudinal movement of the muffler 1 by way of limiting front and back motion of the resilient hanger 17 with the vertical flange surface 9 and the vertical protrusive surface 13 during the longitudinal vibration of the muffler 1. Further, the cover bracket 5 is used to secure the muffler side connecting pins 7 as well as to reinforce the assembly state of the frontal muffler 1 and the exhaust pipe 3 that are welded in an almost perpendicular state.

In accordance with an alternative embodiment, the distance between the two car body side connecting pins 11 is shorter than that of the two muffler side connecting pins 7, such that the axis connecting the two insertion holes of the resilient hanger 17 thus described form an oblique angle above the horizontal surface.

As apparent from the foregoing there is an advantage in the embodiments of the present invention, in that a resilient hanger diagonally inclined above the horizon can efficiently support and minimize the vertical and transverse movements of a muffler.

There is another advantage in that a cover bracket formed with a vertical flange surface and a car body side bracket formed with a vertical protrusion surface are made to closely abut on a rear portion of the resilient hanger, thereby effectively supporting the longitudinal movement of the muffler that occurs during speed changes in a vehicle and improving the strength of the connecting parts between a muffler and an exhaust pipe via the cover bracket.

What is claimed is:

1. A fixing device for an automobile muffler, comprising:
   two muffler side connecting pins, each fixed at a respective one of two sides of a muffler and aligned approximately parallel to a longitudinal axis of the muffler;
   two car body side connecting pins aligned approximately parallel to said muffler side connecting pins and fixed at a car body where the distance between said car body side connecting pins is longer than that of said muffler side connecting pins; and
   two resilient hangers, each comprising:
      a first insertion hole, into which a respective one of said two muffler side connecting pins is inserted; and
      a second insertion hole, into which a respective one of said two car body side connecting pins is inserted;
   wherein said muffler side connecting pins are fixed at the muffler via a cover bracket where said cover bracket is coupled around a connecting part of an exhaust pipe and said muffler;
   wherein said cover bracket is formed with a vertical flange surface toward the front of the automobile and said muffler side connecting pins are fixed to the vertical flange surface, protruding toward the front of the automobile;
   wherein said body side connecting pins are coupled underneath the automobile and fixed to a surface of a body side bracket, said bracket positioning said surface in alignment with the vertical flange surface;
   and wherein an axis connecting said first insertion hole and said second insertion hole defines an angle of about 30 to about 60 degrees with a horizontal axis.

* * * * *